United States Patent [19]
Wilkinson et al.

[11] Patent Number: 5,474,152
[45] Date of Patent: Dec. 12, 1995

[54] LUBRICATION SYSTEM FOR A STARTER CLUTCH ASSEMBLY

[75] Inventors: Ronald E. Wilkinson, Mobile; John L. Woodward, Spanish Port; Ralph B. Benway, Mobile, all of Ala.

[73] Assignee: Teledyne Industries, Inc., Los Angeles, Calif.

[21] Appl. No.: 420,759

[22] Filed: Apr. 12, 1995

[51] Int. Cl.⁶ .................................................. F01M 9/00
[52] U.S. Cl. .................. 184/6.12; 184/109; 192/113.32; 192/41 R; 192/42
[58] Field of Search ................................ 184/6.12, 27.1; 192/41 R, 113.1, 113.32, 42, 113.5

[56] References Cited

U.S. PATENT DOCUMENTS

| 3,983,693 | 10/1976 | Werner . | |
|---|---|---|---|
| 4,191,279 | 3/1980 | Brown | 192/113.32 |
| 4,291,795 | 9/1981 | Charchian et al. | 192/113.32 |
| 4,315,442 | 2/1982 | Cordner . | |
| 4,456,830 | 6/1984 | Cronin . | |
| 4,473,752 | 9/1984 | Cronin . | |
| 4,542,722 | 9/1985 | Reynolds . | |
| 4,615,227 | 10/1986 | Stockton . | |
| 4,895,234 | 1/1990 | Fujino . | |
| 4,958,530 | 9/1990 | Jaseck et al. . | |
| 5,050,441 | 9/1991 | Giometti . | |
| 5,052,518 | 10/1991 | Trommer | 184/6.12 |
| 5,135,085 | 8/1992 | Kinoshita et al. | 192/113.1 |
| 5,138,139 | 8/1992 | Malecha | 192/113.1 |
| 5,167,162 | 12/1992 | Nagashima et al. . | |
| 5,237,882 | 8/1993 | Giometti . | |
| 5,320,204 | 6/1994 | Riggle et al. | 192/113.32 |

FOREIGN PATENT DOCUMENTS

| 2278061 | 11/1990 | Japan | 192/113.32 |
|---|---|---|---|
| 1303816 | 1/1973 | United Kingdom | 192/113.32 |

Primary Examiner—Thomas E. Denion
Attorney, Agent, or Firm—Gifford, Krass, Groh, Sprinkle, Patmore, Anderson & Citkowski

[57] ABSTRACT

A lubrication system for an overriding starter clutch assembly includes an axial input passage through the clutch shaft to radial passages supplying the oil to the inlet of the clutch working unit. A centrifugal pump created by vanes in the clutch housing end face pulls the lubricating oil axially through the clutch.

5 Claims, 1 Drawing Sheet

5,474,152

LUBRICATION SYSTEM FOR A STARTER CLUTCH ASSEMBLY

BACKGROUND OF THE INVENTION

FIELD OF THE INVENTION

This invention relates to a starter clutch assembly, and, more particularly, this invention relates to a lubrication system for an overrunning starter clutch assembly.

Typically an overrunning type clutch is used in starter assemblies. The overrunning type clutch transmits torque in one direction and is freewheeling in the opposite direction. The starter requires a gear reduction from a conventional electric motor to produce the high starting torque necessary. When the engine starts, it instantaneously accelerates towards its running speed forcing the clutch to overrun with its output rotating faster than its input. In automotive engines, the starter is moved out of contact with the engine gear so that it only operates at the high engine speed for a very short period of time, allowing lubrication of the starter clutch to be accomplished by grease packing. In aircraft engines, the clutch output preferably continues to rotate at engine speed, making grease packing impractical. Thus, some kind of continuous lubrication is necessary.

In prior art starter clutches, engine oil has been introduced into the clutch unit and allowed to return to the sump through holes drilled in the sump housing and end clearances with no pumping action. This allows contaminants in the oil to be centrifuged out of the oil and become trapped inside the clutch unit contributing to a diminished service life.

SUMMARY OF THE INVENTION

In the new lubrication system of this invention, engine oil is introduced into the clutch unit through an axial passage drilled in the clutch shaft. The oil flow is then directed radially outward through the shaft to the clutch unit and to the bearing. Where the bearing is a bushing, the oil flow is split through radial holes in the shaft, one set supplying oil to the bearing and another set supplying oil to the inlet end of the clutch unit. The oil must flow into and out of the clutch unit in an axial direction. Working in conjunction with the oil flow through the clutch is a series of passages at the end of the clutch housing which act as a centrifugal pump when the clutch housing overruns relative to the shaft. Oil entering at the inner end of the clutch unit will flow axially through it, flushing out contaminants, and then the oil will be pumped out of the clutch housing and returned to the engine sump. Vanes can be used to create the passages at the end of the clutch housing. The vanes can be straight or curved or they can be at any angle from a backward to a radial or forward slope relative to the direction of rotation. In a preferred illustrated embodiment of the invention, the vanes are straight and backward sloping.

An alternate to vanes can be slots cut in the end of the housing. In any event the vanes or slots must be in the rotating housing member in order to create the centrifugal force to assist in pumping the oil.

When needle bearings are used instead of a bushing, separate radial passages can be eliminated in the shaft for the bearing, and lubrication can be provided by oil spilling off from the inner end of the clutch unit.

BRIEF DESCRIPTION OF THE DRAWING

The advantages of the present invention will be more apparent from the following detailed description when considered in connection with the accompanying drawing wherein.

DETAILED DESCRIPTION OF THE PREFERRED EMBODIMENT OF THE INVENTION

Figure 1:
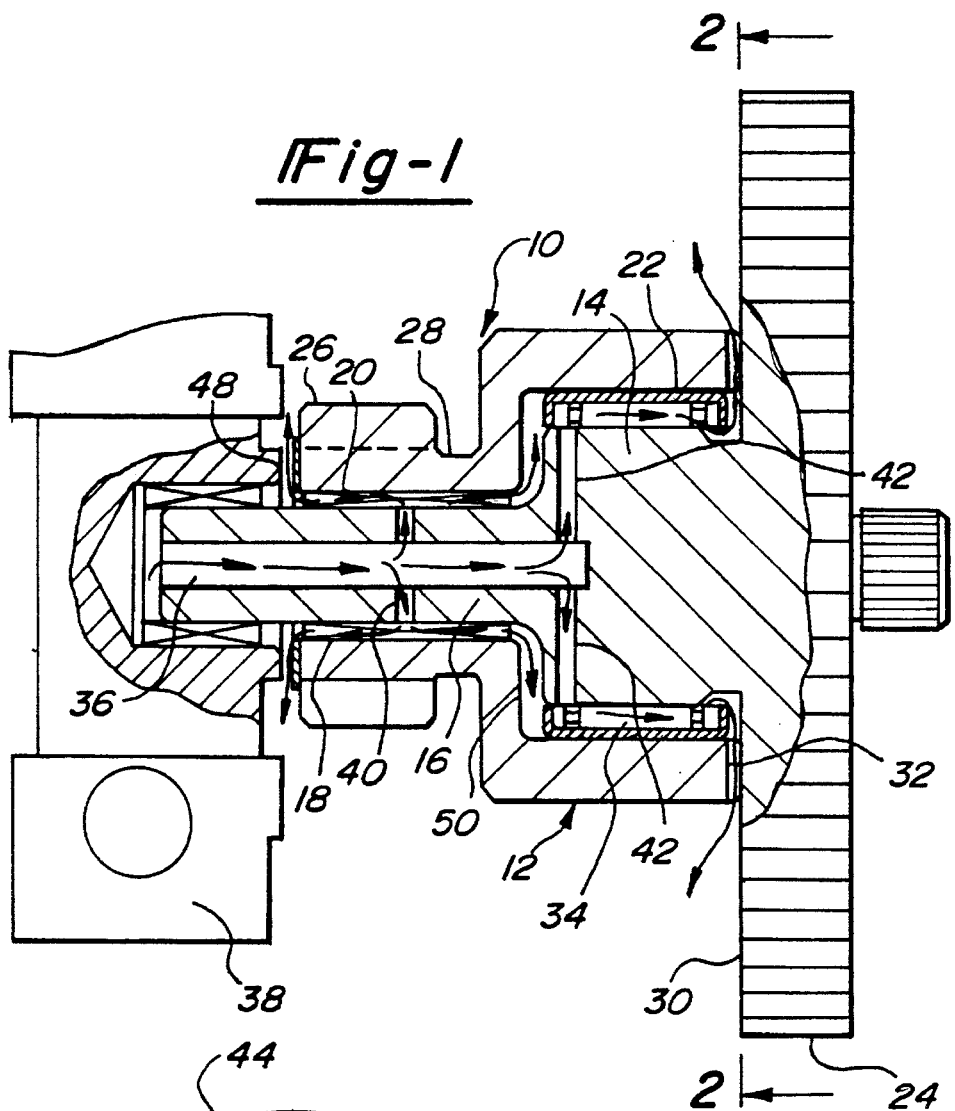
FIG. 1 is an elevational view partially in section showing the overrunning clutch assembly according to the invention.

The clutch assembly 10 according to the invention is shown as including an external clutch housing 12 and an internal clutch unit 14 mounted on a shaft 16. The shaft is carried by a bearing 18, shown as a bushing, mounted in a smaller diameter bearing chamber 20 of the housing 12. The shaft 16 extends through the housing 12 and carries the clutch unit 14 in a larger diameter clutch chamber 22.

An input gear 24 is formed on or is attached to the shaft 16 at the outlet end of the clutch unit 14, and an output gear 26 is formed on or is attached to the exterior wall 28 at the bearing end of the housing. The planar face 30 of input gear 24 is adjacent to the annular end face 32 of housing 12 closing the end of the housing.

The clutch is a shell type roller clutch which transmits the starting torque through its peripheral roller working member 34 in one direction while allowing freewheeling in the opposite direction; that is, when the output gear 26 is being driven by the engine and the input gear 24 is stationary.

Figure 2:
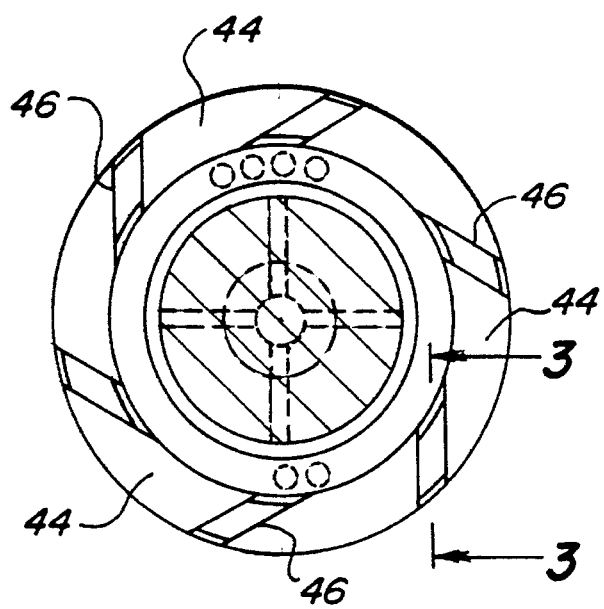
FIG. 2 is an end view taken along line 2—2 of FIG. 1.
Figure 3:
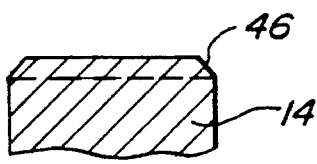
FIG. 3 is a partial sectional view along line 3—3 of FIG. 2.

An axial bore in the shaft 16 serves as an inlet passage 36 receiving oil from engine pump 38. Oil is delivered to a midpoint of bearing 18 by circumferentially spaced radial service passages 40 from the axial passage 36. Oil is also delivered from the axial passage 36 to the inlet end of the clutch peripheral working member 34 by circumferentially spaced radial service passages 42 as seen in FIGS. 1 and 2.

Exit channels 44 are formed in the annular end face 32 of the housing 12 by circumferentially spaced vanes 46.

Lubricating oil delivered to the midpoint of bearing 18 by radial service passages 40 travels axially along the bearing to end clearances 48 and 50. Oil delivered to the clutch working member 34 by radial service passages 42 travels axially along with some oil from end clearance 50 through the working member 34 and is pumped out by passages 44 in the annular end face 32. The exit channels 44 act as a centrifugal pump as the housing 12 rotates in an overriding condition relative to the face 30 of the input gear 24. The exit channels 44 are created by spaced vanes 46 on the end face 32 or they can be created by slots cut into the end face.

If the bearing 18 is of the needle bearing type, the radial service passages 40 can be eliminated with the lubrication being supplied by oil spilling off from the inner end of the clutch unit through end clearance 50.

We claim:

1. A lubrication system for an overrunning starter clutch assembly, said assembly comprising:

wall means forming a generally cylindrical open-ended housing having a first axially extending smaller diameter shaft carrying chamber and a second axially extending larger diameter clutch unit carrying chamber;

a shaft extending through said housing being mounted to said housing for relative rotational movement therewith by an axially extending bearing in said first chamber;

said shaft carrying a clutch unit having a peripheral working member which engages an internal wall of said housing in said second chamber in an engaged clutch condition;

an input gear fixed to said shaft having a face adjacent an open outlet end of said second chamber, said open outlet end being defined by an annular face of said wall means; and an output gear on an exterior surface of said housing surrounding said first chamber;

an improvement in said lubrication system comprising:

an axial lubrication input passage in said shaft;

means for supplying lubrication radially outward from said axial passage to said peripheral working member adjacent an inlet end of said second chamber;

means for supplying lubrication radially outward from said axial passage to said bearing in said first chamber; and a plurality of circumferentially spaced exit channels through said annular face;

whereby oil supplied to said axial input passage will flow radially outward to lubricate said bearing and said clutch unit, and oil will flow axially through the peripheral working member of said clutch unit out through said exit channels, said exit channels acting as a centrifugal pump when said housing overruns said shaft.

2. The lubrication system of claim 1 wherein said bearing comprises a bushing and said means for supplying lubrication to said bearing includes a radial service passage in said shaft.

3. The lubrication system according to claim 2 including a plurality of radial service passages in said shaft supplying lubrication to said bushing.

4. The lubrication system of claim 1 comprising vanes forming said exit channels.

5. The lubrication system of claim 1 including a plurality of radial service passages in said shaft supplying lubrication to the peripheral working member of said clutch unit.

* * * * *